United States Patent [19]
Hawkins et al.

[11] Patent Number: 5,244,586
[45] Date of Patent: Sep. 14, 1993

[54] MACHINE COOLANT RECYCLING SYSTEM

[75] Inventors: Marvin W. Hawkins; Kenneth H. Carder, both of Marshalltown, Iowa

[73] Assignee: Fisher Controls International, Inc., Clayton, Mo.

[21] Appl. No.: 783,502

[22] Filed: Oct. 28, 1991

[51] Int. Cl.$^5$ ................... B01D 21/00; B01D 21/26
[52] U.S. Cl. ..................... 210/806; 210/776; 210/787; 210/805; 210/314; 73/53.01
[58] Field of Search ............... 210/202, 299, 781, 314, 210/360.1, 776, 805, 806, 796, 319, 749; 73/53.01

[56] References Cited

U.S. PATENT DOCUMENTS

| | | | |
|---|---|---|---|
| 4,636,317 | 1/1987 | Lewis | 210/241 |
| 4,772,402 | 9/1988 | Love | 210/241 |
| 4,946,595 | 8/1990 | Miller, Jr. | 210/767 |
| 5,158,677 | 10/1992 | Hewitt et al. | 210/805 |

OTHER PUBLICATIONS

"Guardian Coolant Recycling System", a four-page brochure of Hyde Products, Inc., undated.
"Xybex System 1000", a four-page brochure of Master Chemical Corporation, 1986.
"Yellow Bellied Sump Sucker", a four-page brochure of Purification systems Inc., undated.
"How the Trim SO1 Closed Loop Coolant System Lowers Unite Cost", a one-page brochure of Master Chemical Corporation, undated.
"Free Trial Offer On Permanent Magnetic Sheet Fanners", a one-page brochure of Eriez Manufacturing Co., undated.
"Free Trial Offer On Permanent Magnetic Coolant Cleaners", a one-page brochure of Eriez Manufacturing Co., undated.
"Free Trial Offer On Rare Earth Magnetic Separators", a one-Page brochure of Eriez Manufacturing Co., 1987.
"Free Trial Offer On Permanent Magnets In Stock", a one-page brochure of Eriez Manufacturing Co., undated.
"Separation, Vibratory, Metal Detection and Magnamation Equipment", a six-page brochure of Eriez Manufacturing Co., undated.
A five-page brochure of Penberthy regarding its Mixer/Heater Model CTE, Jul. 1990.
"Design Considerations", a one-page document of Penberthy, undated.
"Selection and Installation", a one-page document by Penberthy, undated.
"Pratt and Whitney Cuts Costs... With Coolant Purifiers", a one-page excerpt from Automatic Machining, Feb. 1987.
"Pasteurization: Key to Quality Coolant Recycling", a four-page document by George F. Williams, et al., dated Jul./Aug. 1986.
A two-page brochure of Sanborn, Inc. regarding its Patriot recovery systems, undated.
A two-page brochure of Monlan Corporation regarding its HWT Series, undated.
"Integrated Coolant Recovery System", a one-page brochure of Monlan Corporation, dated Apr. 1987.
"Mon-A-Vac-Coolant Filtration Systems For Machine Tool Operations", a four-page brochure of Monlan Corporation, undated.
"Monlan Coolant Filtration System Increases Efficiency In Automotive Plant", a one-page technical bulletin of Monlan Corporation, undated.
"America's Broadest Line... Metal Chip Conveyors and Coolant Filtration Systems", a four-page technical bulletin of Monlan Corporation, undated.
"Standard Hydrocyclones for the Metal Removal Industry", a twelve-page catalog of Monlan Corporation, undated.
"Mon-A-Mag Magnetic Coolant Filters", a four-page catalog of Monlan Corporation, undated.
"Monlan Mon-A-Matic Vacuum Filter system", a sixteen-page catalog of Monlan Corporation, undated.
"Coolant 'Cycler", a two-page document of Monlan Corporation, undated.
"New Water-Based Coolant Reclaimer", Metalworking News, Sep. 5, 1988.
"Hyde Guardian 200", a two-page brochure of Hyde Products, Inc., undated.
A book entitled Coolant Filtration by James J. Joseph, Jan. 1987.
A booklet submitted by J. W. Moore Process Equipment Co. to Mr. Marvin Hawkins, Jul. 18, 1990.
Sanborn... Pioneers in Recovery System Technology, a one-page advertisement of Sanborn, Inc., undated.

Primary Examiner—Robert A. Dawson
Assistant Examiner—David Reifsnyder
Attorney, Agent, or Firm—Marshall, O'Toole, Gerstein, Murray & Borun

[57] ABSTRACT

A machine coolant recycling system has a holding tank in which machine coolant to be recycled is accumulated. The machine coolant in the holding tank is continuously filtered for a predetermined period of time and the surface of the machine coolant is continuously skimmed to remove undesired contaminants therefrom. The machine coolant from the holding tank is supplied to a centrifuge where it is centrifuged and is then pumped to a blending tank where it is chemically tested and reconstituted to its original composition. The machine coolant is then again continuously filtered until it is needed.

17 Claims, 5 Drawing Sheets

MACHINE COOLANT RECYCLING SYSTEM

BACKGROUND OF THE INVENTION

The present invention relates to a recycling system for a liquid, water-based machine coolant in which the coolant is recycled by various skimming, filtration, and/or centrifuge steps to remove contaminants from the machine coolant such as undesired oils, emulsifiers and/or particulate matter.

Machine coolant recycling systems have been used in the past to recycle liquid, water-based machine coolants used to cool various machines contained in a manufacturing plant or a large machine shop, for example. Typically, a machine in a manufacturing plant has a dedicated coolant recirculating system in which coolant is continuously supplied from a tank, used to cool the machine, and returned to the tank. The machine coolant in the tank is periodically checked, every three weeks for example, to determine whether the coolant requires recycling or disposal.

During normal use, water-based machine coolants become contaminated with various substances due to their contact with the internal structure of the machines which they cool. These substances include particulate matter of various sizes, such as minute metal particles or shavings, oils or other similar contaminants, and/or emulsifiers. It is necessary to remove such contaminants from the machine coolant before it can be reused.

If it requires recycling, the machine coolant is removed from the tank, via a portable sump sucker for example, and transferred to a central recycling system which typically services a large number of machines. Various types of central recycling systems have been used to recycle the machine coolant.

In one prior recycling system, the machine coolant was accumulated in a holding tank from various points in a plant. Some of the contaminants which floated on the surface of the coolant were removed by a vertically moving endless belt in a relatively inefficient manner. The machine coolant was then supplied to a centrifuge that was used to remove particulate matter and undesirable emulsifiers that contaminated the coolant.

After being centrifuged, the machine coolant was chemically tested to determine whether its chemical components were in proper proportion. The constituents of one water-based coolant are 91% deionized water, 3% rust inhibitor, and 6% water-soluble oil. If the proportions of the components of the coolant were not within specification, the necessary components were added to the coolant to bring the components back into proper proportion. The coolant was then returned to the machines.

SUMMARY OF THE INVENTION

The present invention is directed to a machine coolant recycling system and to a method of recycling machine coolant in which various processing steps are used to remove undesired contaminants from the coolant. The recycling of the coolant may be accomplished using various combinations of processing steps including single- and/or dual-stage filtering, skimming the surface of the coolant to remove contaminants and centrifuging the coolant.

The machine coolant may be recycled by first filtering the coolant to remove a first portion of contaminants, then centrifuging the coolant to remove a second portion of contaminants, and then filtering the coolant to further reduce the amount of contaminants therein. The filters used in the first filtering step may have a relatively large orifice size, whereas the filters used in the final filtering step may have a relatively small orifice size. The final filtering step may be continuously performed to minimize the contaminant content of the coolant.

Alternatively, the coolant may be recycled by removing a portion of the contaminants from the surface of the coolant via a skimmer and then filtering the coolant to further remove contaminants. After the coolant is subjected to at least one purifying step, such as filtering, skimming or centrifuging, the coolant may be chemically tested to determine whether ingredients need to be added to bring the coolant back to its preferred composition. Further methods of recycling the coolant may utilize various combinations of the skimming, filtering, testing and centrifugation steps.

Due to the combination of various different methods of removing contaminants, the machine coolant resulting from the recycling system is of relatively high purity containing a minimal amount of contaminants. The manner in which the machine coolant is recycled is relatively efficient and does not require an undue amount of recycling time.

These and other features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1A:
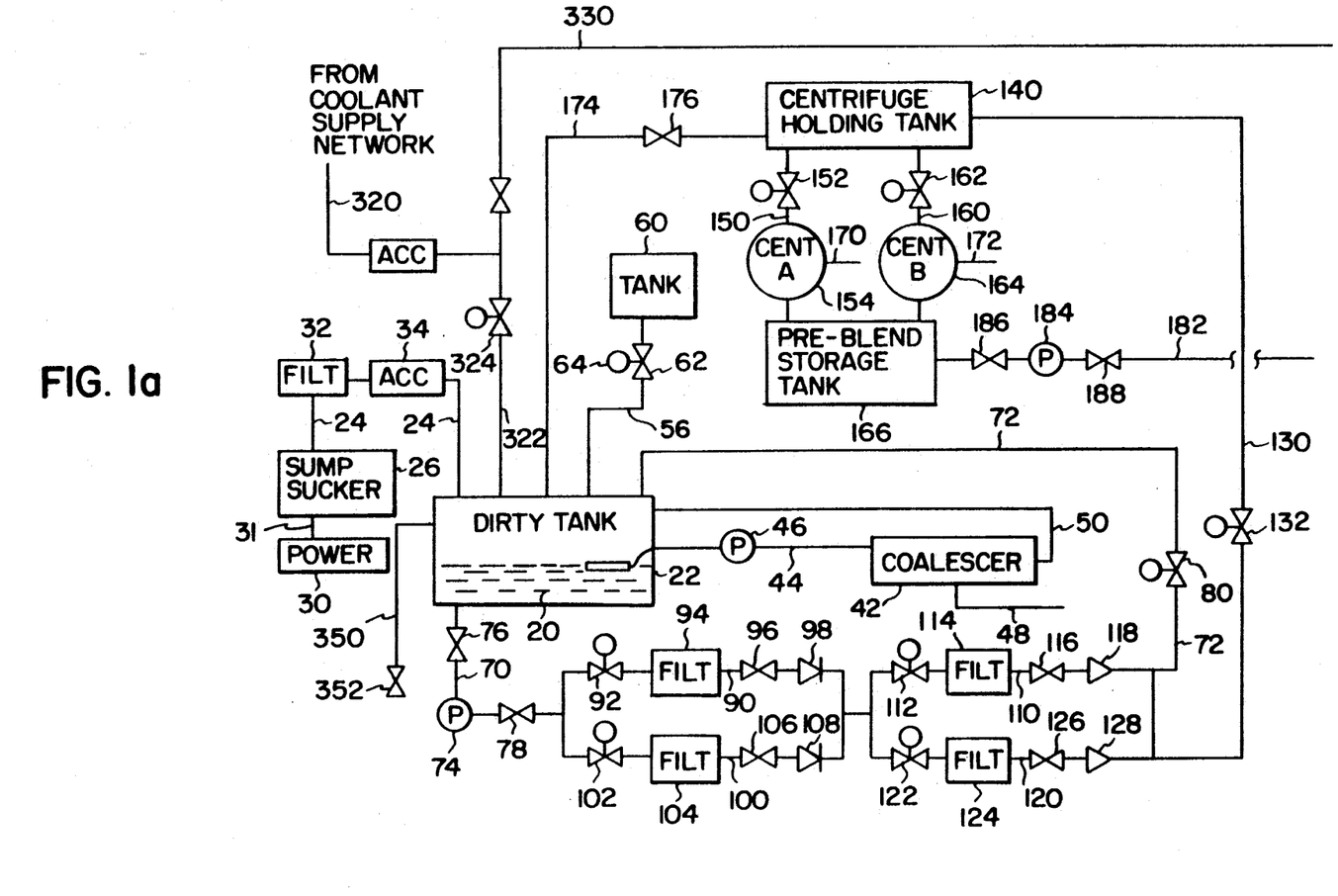
FIGS. 1a and 1b are schematic diagrams of a preferred embodiment of a machine coolant recycling system in accordance with the present invention.
Figure 1B:
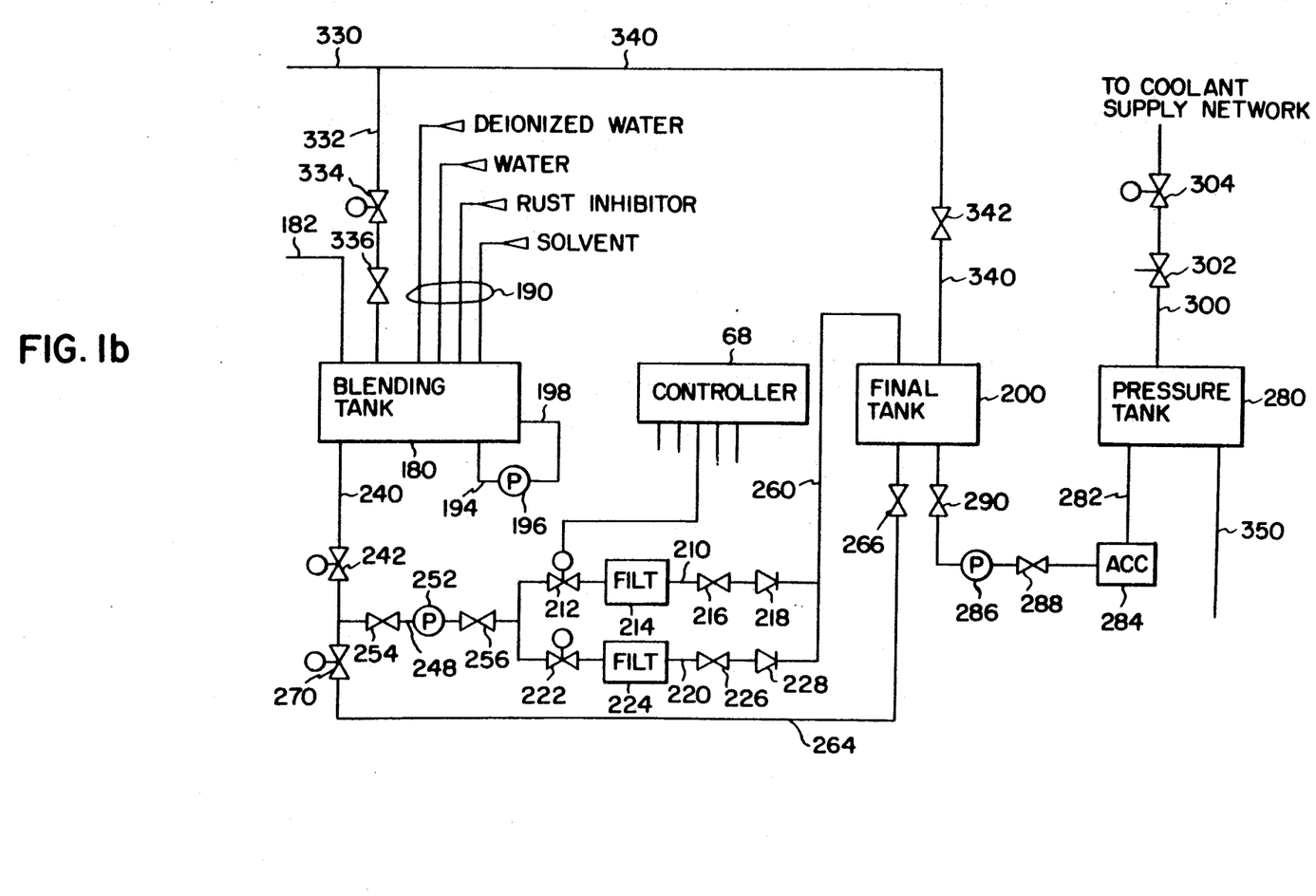

A preferred embodiment of a machine coolant recycling system in accordance with the invention is illustrated in FIGS. 1a and 1b. Referring to FIG. 1a, used machine coolant 20 to be recycled is accumulated in a dirty tank 22. The machine coolant is transferred to the dirty tank 22 via a pipe or conduit 24 which may be connected to a portable sump sucker 26.

One or more sump suckers 26 may be used to retrieve dirty machine coolant from the machinery in the plant where the recycling system is used. When a sump sucker 26 has been filled with used machine coolant, it is transported to the recycling system and fluidly connected to the conduit 24. Each sump sucker 26 has an integral pump which, when connected to a power supply 30 via an electrical line 31, causes the used machine coolant to be pumped from the sump sucker 26 to the dirty tank 22 via the conduit 24. As the machine coolant flows into the dirty tank 22, it is filtered by a filter 32 and passes through an accumulator 34 to register the volume of machine coolant entering the dirty tank 22. Although various filters may be used, the filter 32 is preferably bag-type filter having an orifice size of 120 microns.

A skimmer 40 is provided in the interior of the dirty tank 22 and floats on the surface of the used machine coolant 20. The skimmer 40 is used to remove unwanted oil and other contaminants floating on the surface of the machine coolant 20.

The skimmer 40 is connected to a coalescer 42 via a conduit 44. A pump 46 pumps the fluid from the skimmer 40 to the coalescer 42, which is basically an oil/water separation unit. The coalescer 42 separates the waste oil and contaminants from the machine coolant, expels the waste materials into a waste conduit 48 connected to a waste tank (not shown), and returns the filtered machine coolant to the dirty tank 22 via a conduit 50. The skimmer 40 and coalescer 42 together may be a Model TW05 tramp oil separator with optional air sparger commercially available from Hyde Products, Inc.

The pumps of the coolant recycling system are shown schematically. It should be understood that any type of conventional pumps may be used and that the particular pump or type of pump used is not important. The used machine coolant in the dirty tank 22 is treated with an anti-bacterial agent to minimize the growth of bacteria. The anti-bacterial agent is provided to the dirty tank 22 via a conduit 56 connected to a barrel or tank 60. The amount of anti-bacterial agent supplied is controlled by a valve 62 with an automatically controlled valve actuator 64. Although different anti-bacterial agents may be used, one such agent that is preferred is TC-143 stabilizer commercially available from Master Chemical Corporation.

In FIGS. 1a and 1b, valves shown with valve actuators are electrically connected to and automatically controlled by a controller 68 (FIG. 1b). Valves shown without valve actuators are not controlled by the controller 68 but are manually operable.

Although the controller 68 is electrically connected to the automatically controlled valves and other controlled components in the coolant recycling system such as motors, pumps, etc., these connections have not been shown in the drawings for purposes of simplicity. Also, a number of conventional components, such as fluid level sensors and pressure switches, have been also been omitted from the drawings.

The dirty tank 22 includes a continuously operating aeration system (not shown) that consists of a air-driven motor that sucks coolant from the dirty tank 22, injects air bubbles into the coolant via a venturi effect, and injects the coolant and oxygen bubbles into the bottom portion of the dirty tank 22. The aeration system performs two general functions, one of which is limiting or reducing bacterial growth in the coolant. The upward movement of the oxygen bubbles caused by the aeration also accelerates the natural travel of contaminants towards the surface of the coolant and enhances the efficiency of the skimming process performed by the skimmer 40.

A conduit 70 supplies coolant from the dirty tank 22 to a first filtration system and a conduit 72 returns the coolant to the dirty tank 22 after it is filtered. Coolant is pumped through the filtration system via a pump 74 connected between a pair of manually operated, normally open valves 76, 78, and an automatically operated valve 80 controls the flow of coolant back to the dirty tank 22 via the conduit 72.

A first part of the filtration system includes a fluid conduit 90 having an automatically controlled valve 92, a filter 94, a manually controlled, normally open valve 96, and a one-way, check valve 98 connected thereto. A second fluid conduit 100 is connected in parallel to the fluid conduit 90. The second fluid conduit 100 has an automatically controlled valve 102, a filter 104, a manually controlled, normally open valve 106 and a check valve 108 connected thereto. The filters 94, 104 are bag-type filters having an orifice size of 120 microns.

A second part of the filtration system includes a fluid conduit 110 having an automatically controlled valve 112, a filter 114, a manually controlled, normally open valve 116, and a check valve 118 A second fluid conduit 120 is connected in parallel to the fluid conduit 110. The second fluid conduit 120 has an automatically controlled valve 122, a filter 124, a manually controlled, normally open valve 126 and a check valve 128. The filters 114, 124 are cartridge-type filters having an orifice size of 40 microns.

During normal operation, machine coolant is passed through only one of the two parallel fluid conduits in each part of the first filtration system. For example, the valves 92 and 112 might be opened and the valves 102 and 122 might be closed, in which case coolant would pass through the conduits 90 and 110 and be filtered by the filters 94 and 114. Alternatively, the valves 92 and 122 might be opened and the valves 102 and 112 might be closed in which case the coolant would pass through the conduits 90 and 120. The use of redundant filtering conduits allows the filters to be changed without requiring the coolant recycling system to be shut down.

Each of the filters 94, 104, 114, 124 may be provided with a pressure switch (not shown) which determines when the filter backpressure increases to a predetermined level, thus indicating that the filter is clogged and needs to be replaced.

The first filtration system is connected to a centrifugation system via a conduit 130. Coolant flow through the conduit 130 is automatically controlled by a valve 132. The centrifugation system includes a centrifuge holding tank 140, a first conduit 150 having a valve 152 and a centrifuge 154 connected thereto, a second conduit 160 having a valve 162 and a centrifuge 164 connected thereto, and a pre-blend storage tank 166.

During normal operation, both of the centrifuges 154, 164 are used to further remove contaminants from the coolant. The contaminants are removed via a pair of waste conduits 170, 172 connected to one or more waste tanks (not shown).

The centrifuge holding tank 140 is connected to the dirty tank 22 via a conduit 174 controlled by a manually operated, normally closed valve 176. This fluid connection, which is not used during normal operation, allows the contents of the centrifuge holding tank 140 to be emptied into the dirty tank 22 in certain circumstances, such as where maintenance or repair of the holding tank 140 is required The pre-blend storage tank 166 is connected to a blending tank 180 (FIG. 1b) via a fluid conduit 182. Coolant may be pumped from the storage tank 166 to the blending tank 180 via a pump 184 connected between two manually operated, normally open valves 186, 188.

Referring to FIG. 1b, the purpose of the blending tank 180 is to allow the addition of chemical fluids to the machine coolant in order to bring the coolant back to its preferred composition, which is 91% deionized water, 3% rust inhibitor and 6% water-soluble oil. The coolant in the blending tank 180 is periodically chemically tested via a conventional manual procedure, and the required chemical components necessary to bring the coolant back to its preferred composition are added via four fluid conduits 190.

A mixing system is connected to the blending tank 180 in order to ensure that any fluid components that have been added to the coolant are sufficiently mixed. The mixing system includes a fluid conduit 194 that draws coolant from the blending tank 180, a pump 196 and a return fluid conduit 198.

The coolant pumped back into the blending tank 180 via the return conduit 198 is supplied to a plurality of circulating tank eductors (not shown) attached at spaced-apart points along a portion of the conduit 198 that extends into the interior of the tank 180. Each tank eductor has a plurality of inlets and an outlet.

As the coolant is pumped back into the tank 180 through the conduit 198, coolant from the interior of the tank 180 is drawn into the inlets of each eductor by the venturi effect and mixed with the coolant in the return conduit 198, and the combined fluid stream is expelled via each eductor outlet The circulating tank eductors are commercially available from Penberthy Co. of Prophetstown, IL.

The blending tank 180 is connected to a final tank 200 via a second filtration system having a first fluid conduit 210 with an automatic valve 212, a filter 214, a manually operated, normally open valve 216 and a check valve 218 and a second conduit 220 with an automatic valve 222, a filter 224, a manually operated, normally open valve 226 and a check valve 228. In normal operation, coolant passes through only one of the conduits 210, 220, depending on which one of the valves 212, 222 is open. The filters 214, 224 are cartridge-type filters having an orifice size of 12 microns.

Coolant may be provided to the second filtration system via a conduit 240 having an automatic valve 242 therein and a conduit 248 having a pump 252 and two manually operated, normally open valves 254, 256 therein. Coolant is pumped from the second filtration system to the final tank 200 via a fluid conduit 260. Alternatively, coolant may be provided to the second filtration system from the final tank 200 via a path consisting of a conduit 264 having a manually operated, normally open valve 266 therein. Coolant flow through the conduit 264 is controlled by an automatic valve 270.

During operation of the recycling system, coolant is initially pumped from the blending tank 180, through the second filtration system and into the final tank 200 via a path consisting of conduits 240, 248, 210 or 220, and 260. Subsequently, the flow of coolant from the blending tank 180 through the above path is terminated, and coolant from the final tank 200 is continuously recirculated through the second filtration system via a path consisting of the conduits 264, 248, 210 or 220, and 260. This continuous recycling of the coolant through the second filtration system further reduces the amount of any impurities or contaminants in the coolant.

The centrifuge holding tank 140, the pre-blend storage tank 166 and the final tank 200 each have an aeration system (not shown) like the one described in connection with the dirty tank 22.

The final tank 200 is connected to a pressure tank 280 via a fluid conduit 282 having an accumulator 284 and a pump 286 connected between two manually operated, normally open valves 288, 290. The pump 286 is automatically controlled to keep the pressure of the machine coolant in the pressure tank 280 within predetermined limits, such as between 50 and 60 pounds/square inch (35 and 42 N/cm$^2$).

The pressure tank 280 is connected to a fluid conduit 300 having a manually operated, normally open valve 302 and an automatic valve 304. The conduit 300 is connected to an overhead coolant supply network (not shown) extending throughout the entire plant so as to provide numerous convenient points of access to recycled machine coolant.

It is advantageous to keep the coolant provided in the supply network continuously recirculating. Since the supply network is provided overhead where heat from the machinery in the plant collects, keeping the coolant recirculating minimizes or reduces the amount of heat absorbed by the coolant and also minimizes or reduces the growth of bacteria as a result. To this end, portions of the coolant in the supply network are periodically returned to the recycling system via a return conduit 320 (FIG. 1a). Coolant may flow through the return conduit 320 to the dirty tank 22 via a conduit 322 under the control of an automatic valve 324.

The coolant in the return conduit 320 may also be provided to either the blending tank 180 or the final tank 200. Coolant from the return conduit 320 may be provided to the blending tank 180 via a path consisting of a conduit 330 and a conduit 332. Control of the flow of the coolant through the conduit 332 is accomplished by an automatic valve 334. The conduit 334 also includes a restrictor valve 336.

Coolant from the return conduit 320 may be provided to the final tank 200 via conduit 330 and 340. The amount of coolant provided to the final tank 200 via this path may be controlled indirectly by the valve 334 in the conduit 332, since the total coolant flow from the conduit 330 is split between the two conduits 332 and 340. The conduit 340 also includes a restrictor valve 342.

As should be apparent from the foregoing, the coolant flow from the return conduit 320 may be apportioned in any manner among the dirty tank 22, the blending tank 180 and the final tank 200 by controlling the position of the valves 324 and 334. In any case, the coolant is recirculated within the coolant supply network at a rate of 3–4 gallons per minute.

The pressure tank 280 also has a fluid conduit 350 with a manually operated, normally closed valve 352 (FIG. 1a) which connects it to the dirty tank 22. The fluid conduit 350, which is not utilized in normal operation of the system, is provided in case the pressure tank 280 needs to be emptied for maintenance or repair purposes.

OPERATION

The general operation of the machine coolant recycling system is as follows After a sufficient amount of used coolant is collected in the dirty tank 22, the coolant is filtered by continuously recirculating it through the first filtration system (FIG. 1a bottom) and back into the dirty tank 22 for a predetermined period of time, 30 minutes for example. During this process, the coolant may pass through the filtration system a number of times.

The coolant is then pumped to the centrifugation system (FIG. 1a top) where it is centrifuged once, and then it is pumped to the blending tank 180 (FIG. 1b) where any necessary components are blended into the coolant. After being blended, the coolant is filtered by the second filtration system (FIG. 1b bottom) and pumped to the final tank 200. The coolant in the final tank 200 is then continuously recirculated between the final tank and the second filtration system so as to accomplish further filtering. During this process, the coolant may pass through the filtration system a number of times. Finally, the coolant is pumped from the final tank 200 to the pressure tank 280 so as to keep the fluid pressure with the tank 280 within predetermined limits so that adequate coolant pressure is supplied to the coolant supply network.

The detailed operation of the recycling system is described below in connection with FIGS. 2a-2c, which are a flowchart of a computer program executed by the controller 68. The controller 68 may be a conventional programmable logic controller such as a Model 1010-BT commercially available from Metra Instruments or any other type of controller, microprocessor, or computer.

Figure 2A:
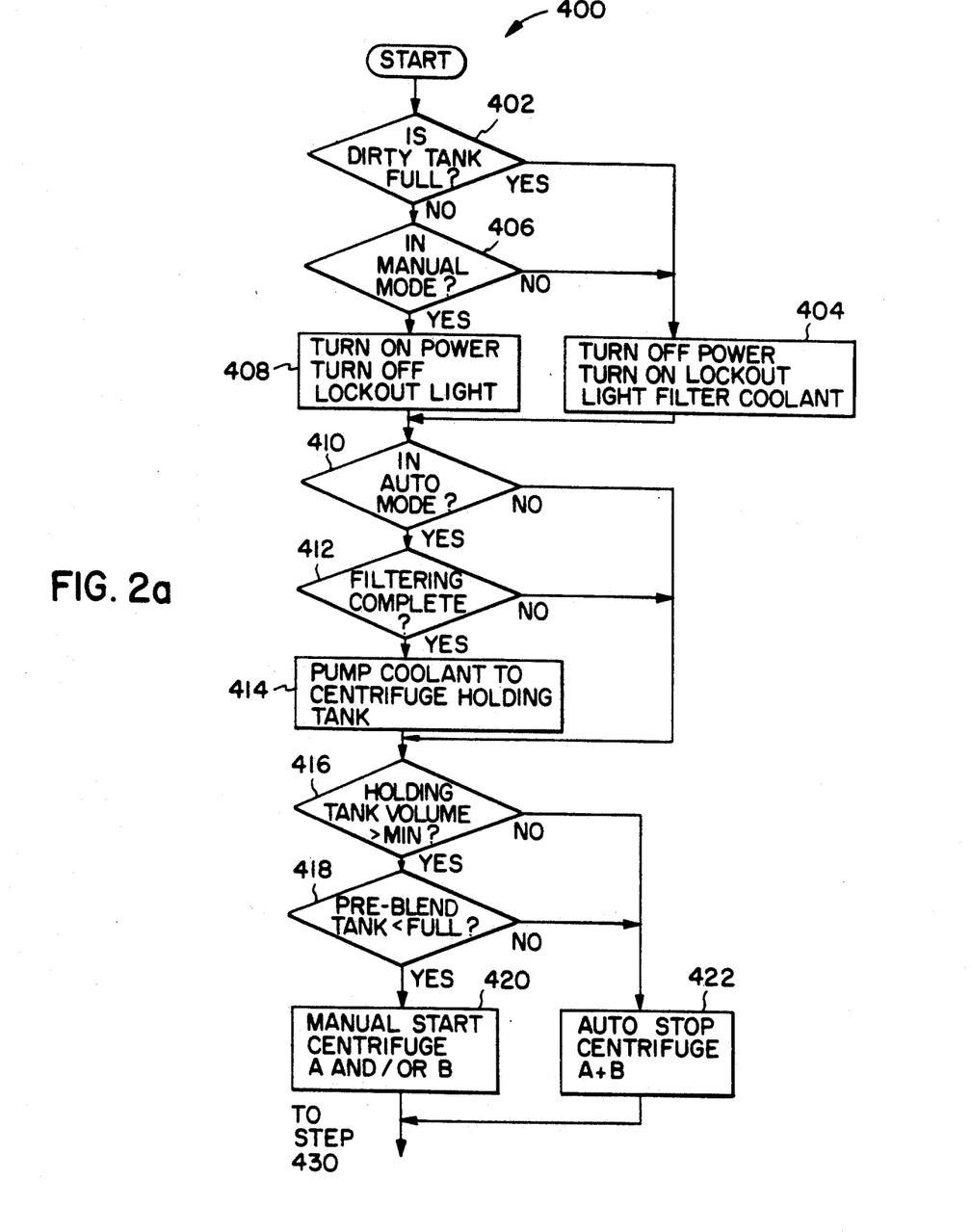
FIGS. 2a–2c illustrate a flowchart of the computer program that controls the operation of the machine coolant recycling system.
Figure 2B:
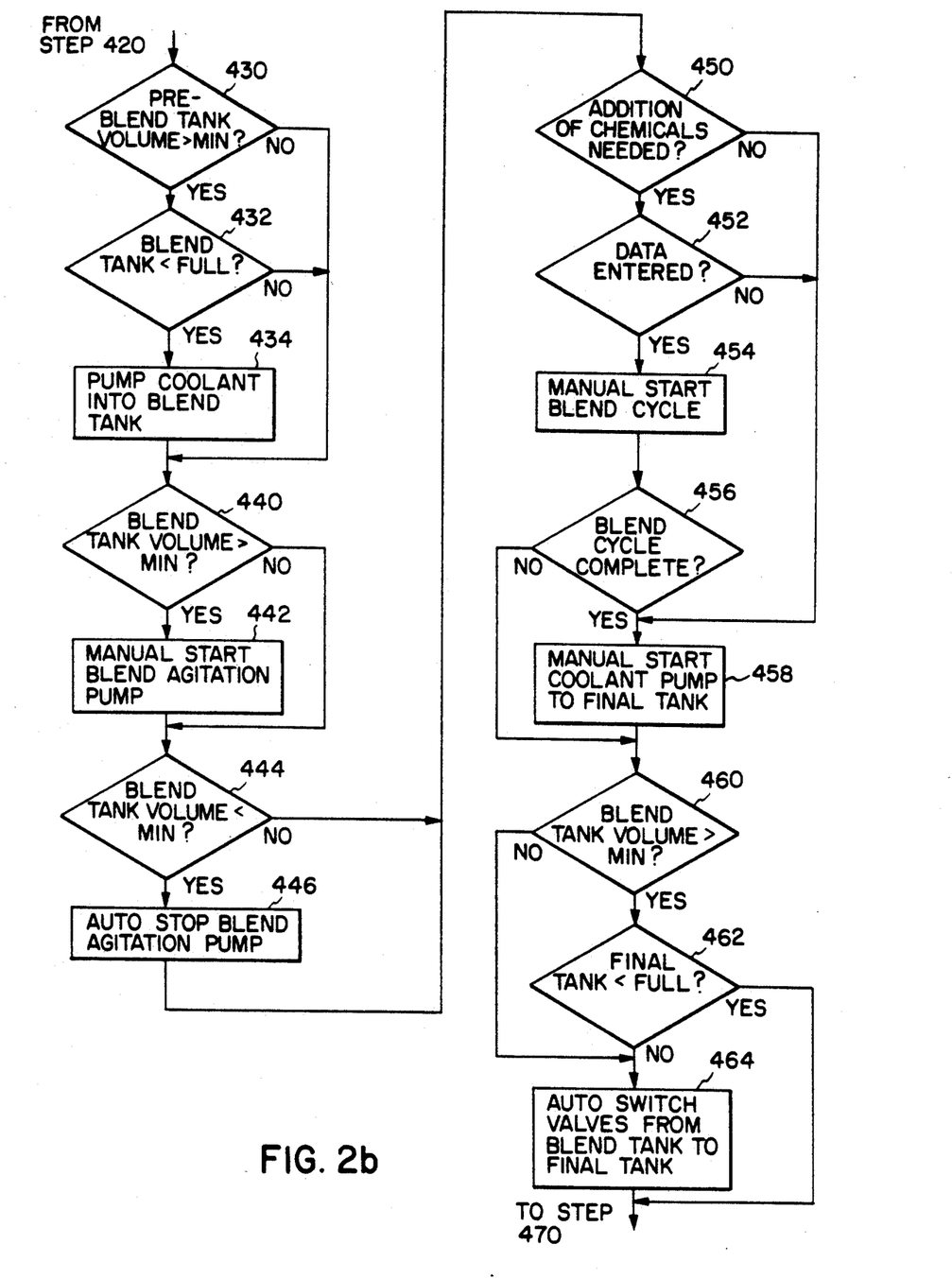
Figure 2C:
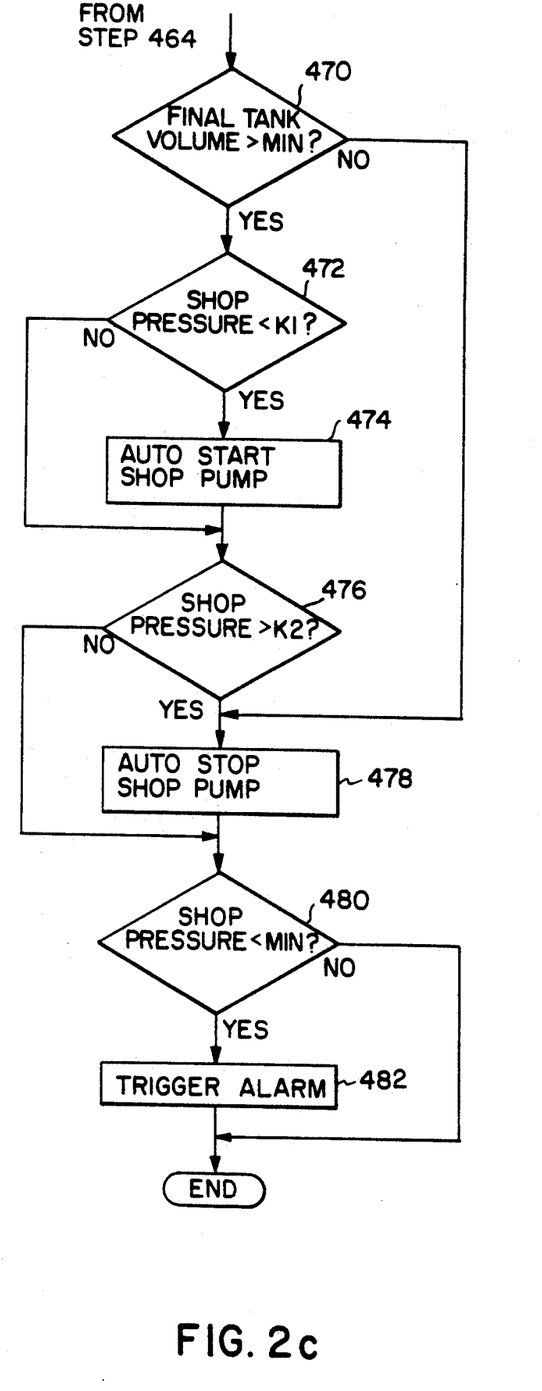

The entire flowchart shown in FIGS. 2a-2c is periodically executed by the controller at a relatively fast rate, every 20 milliseconds, for example. It should be appreciated that the various tasks accomplished by the system, such as a particular pumping action, are not completed during a single execution of the corresponding step in the flowchart For example, pumping coolant from one tank to another tank may require 10 minutes Each time the flowchart is executed (50 times per second), the appropriate pump would remain activated until the expiration of the 10 minutes required. Thus, the 10 minute pumping step would be active for 30,000 iterations of the flowchart (50 iterations/second × 60 seconds/minute × 10 minutes). The operation of the controller 68 can thus be viewed as checking the status of a number of tasks very frequently, and starting and stopping the various tasks relatively infrequently, as appropriate.

The coolant recycling procedure is initiated when the dirty tank 22 is full or when there is at least a predetermined amount of used coolant in the dirty tank 22. Referring to FIG. 2a, at step 402 the controller determines whether the dirty tank 22 is full, or at least has a predetermined amount of coolant therein. This may be accomplished by reading a fluid level transducer (not shown) connected to generate as proportional to the fluid level within the dirty tank 22. If the dirty tank 22 is full, the controller branches to step 404 where the power to the power supply 30 is switched off, where a "lockout light" is illuminated, and where the coolant is filtered.

As described above, the sump suckers 26 from which the used coolant is supplied to the dirty tank 22 have integral pumps which obtain their power from the supply 30. By turning off the power supply 30 at step 404, no more coolant can be added to the dirty tank 22 from the sump suckers 26, thus preventing the already-full dirty tank 22 from overflowing. The lockout light is a signal to the operator that the power supply 30 has been shut off and that no more coolant should be added to the dirty tank 22.

At step 404, the coolant is filtered by continuous recirculation between the dirty tank 22 and the first filtration system. This is accomplished by turning on the pump 74, opening the valve 80 to the dirty tank 22, and closing the valve 132 to the centrifuge holding tank 140.

If the dirty tank 22 was not full as determined at step 402, the controller branches to step 406 where the controller determines whether it is in the manual mode. When the system is in the automatic mode, the coolant in the dirty tank 22 is being repeatedly filtered in recirculating fashion via the first filtration system for a predetermined period of time. In the manual mode, no filtering is being performed. It is desirable that coolant is only added during the manual mode. If coolant were added during the middle of a filtering cycle of a predetermined length, the newly added coolant would not be filtered as many times as desired.

Accordingly, if the system is not in the manual mode, meaning that a filtering cycle of a predetermined duration is taking place, the controller branches to step 404 where the power supply 30 is turned off and the lockout light is illuminated. If the system is in the manual mode, the controller branches to step 408 where the power supply 30 is turned on and the lockout light is extinguished since it is okay to add coolant.

The next sequence of steps 410–414 determines when the coolant in the dirty tank 22 is pumped to the centrifugation system. This takes place after the coolant has been filtered for a predetermined duration during the automatic mode.

At step 410, if the system is not in the automatic mode, meaning no filtering is taking place, the controller skips to the next portion of the program. If the system is in the automatic mode, the controller branches to step 412 where it determines whether the filtering is complete Since the filtering is performed for a predetermined period of time, the filtering is completed at the expiration of that time period.

If the filtering is completed, the controller branches to step 414 where the coolant in the dirty tank 22 is pumped into the centrifuge holding tank 140. This pumping action is accomplished by closing the valve 80 and opening the valve 132 so that the coolant is pumped by the pump 74 from the dirty tank 22 to the centrifuge holding tank 140 via a path consisting of the conduits 70, 90 or 100, 110 or 120, and 130.

Steps 416–422 determine when the centrifuges 154, 164 are stopped and started. In general, the centrifuges 154, 164 are only operated when the fluid level in the centrifuge holding tank 140 is above a minimum value and when the pre-blend storage tank 166 is not full. At steps 416 and 418, if the fluid volume of the centrifuge holding tank 140 is greater than a minimum volume and the pre-blend tank 166 is not full, the controller branches to step 420, where the operator of the system is given a visual prompt on an operator interface terminal (not shown) that one or both of the centrifuges may be started. The term "manual start" is used in step 420 since operator intervention is required.

If the holding tank 140 volume is not less than a minimum, or if the pre-blend storage tank 166 is full, then the controller branches to step 422 where the controller automatically stops both centrifuges 154, 164 without operator intervention.

Since it is undesirable to operate the centrifuges 154, 164 when there is no coolant passing through them, the conduits 150, 160 may each be provided with a respective fluid detector (not shown) to detect when either of the conduits 150, 160 is empty, in which case the centrifuge 154, 164 associated with that conduit would be automatically turned off.

Referring to FIG. 2b, steps 430–434 determine when the coolant that has been temporarily stored in the pre-blend storage tank 166 is pumped to the blending tank 180. This pumping action occurs when the volume of coolant in the pre-blend storage tank 166 is more than a predetermined minimum volume as determined at step 430 and when the blending tank 180 is not full of coolant as determined at step 432. The pumping action is accomplished by the pump 184 (FIG. 1a) in the conduit 182 connecting the pre-blend storage tank 166 to the blending tank 180.

Steps 440–446 relate to the activation and deactivation of the agitation pump 196 in the blending tank 180. Generally, the agitation pump 196 operates as long as the volume of coolant in the blending tank 180 is above a predetermined minimum to ensure that no pump cavitation occurs. If the coolant volume is above the minimum as determined at step 440, the controller branches to step 442 where the operator is given a visual prompt, via the operator interface terminal connected to the controller 68, so that he can manually start the mixing pump 196. If the coolant volume falls below the minimum as determined at step 444, the mixing pump 196 is automatically stopped.

As described above, the coolant in the blending tank 180 is periodically tested and, when necessary, chemical fluid components are added to the coolant via the conduits 190 to bring the coolant back to its preferred chemical composition. Steps 450–454 relate to the addition of these fluids. At step 450, the controller determines whether fluids need to be added to the coolant via the conduits 190. The controller makes this determination based on the status of an operator-set flag. After performing a chemical test on the coolant in the blending tank 180, the operator will set a "chemicals needed" flag, by depressing a button on the operator interface terminal, if any fluid additions need to be made via the conduits 190.

If chemical fluids need to be added, the controller branches to step 452. If the data relating to the amounts of chemical fluids to be added has been entered into the system via the operator interface terminal, the controller proceeds to add the specified fluid amounts during the blend cycle of step 454, which is manually started by the operator. At step 452, if the operator has not yet entered the specified fluid amounts to be added, the controller skips the blending cycle of step 454.

Steps 456–464 control the pumping of coolant from the blending tank 180 to the final tank 200 and the continuous filtering of the coolant in the final tank 200. The system elements controlled by these steps are the pump 252 and the valves 242, 270.

At step 458, the coolant is pumped from the blending tank 180 to the final tank 200, via the conduits 248, 210 or 220, and 260, by starting the pump 252 if it is not already operating and opening the valve 242 and closing the valve 270. These actions are manually started by the operator, who knows when there is coolant in the blending tank 180 that needs to be pumped. Step 458 can be performed only when the blend cycle, explained above, has been completed as determined in step 456.

Once the pumping has been manually started in step 458, steps 460–464 determine how long that pumping action continues. At step 460, if the volume of coolant in the blending tank 180 is not greater than a minimum volume, the controller branches to step 464 where the valve 242 is closed and the valve 270 is opened so as to supply coolant to the second filtration system from the final tank 200 instead of the blending tank 180. This switching of the valves 242, 270 is also performed if the final tank 200 is full as determined at step 462.

During normal operation of the system, the pump 252 is always activated and pumps coolant through the second filtration system from either the blending tank 180 or the final tank 200. The manual start of the pump 252 in step 458 is necessary because, in some circumstances such as emergencies or maintenance for example, the pump 252 may be shut off. However, in normal operation, when the manual start of the pump 252 is performed the pump 252 is already operating.

Referring to FIG. 2c, steps 470–482 relate to keeping the pressure of the coolant provided to the coolant supply network from the pressure tank 280 within predetermined limits. The pressure in the pressure tank 280 is controlled by selective activation of the shop pump 286.

If the coolant volume in the final tank 200 is not greater than a minimum value as determined at step 470, the controller branches to step 478 where the shop pump 286 is stopped. If the pressure of the coolant in the pressure tank 280 is less than a predetermined constant K1 as determined at step 472, then the pressure is too low and the shop pump 286 is automatically started by the controller. If the pressure of the coolant in the pressure tank 280 is greater than a predetermined constant K2 as determined at step 476, then the pressure is too high and the shop pump 286 is automatically stopped at step 478. If the pressure of the coolant in the pressure tank 280 falls below a minimum value as determined at step 480, an alarm is triggered at step 482.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A method of recycling machine coolant comprising the steps of:
    (a) accumulating in a tank a volume of machine coolant to be recycled, said machine coolant being collected from a number of various points remote from said tank, said machine coolant containing undesired contaminants;
    (b) filtering said volume of machine coolant for a period of time to remove a first portion of said undersized contaminants;
    (c) after said machine coolant is filtered in said step (b), centrifuging said machine coolant to remove a second portion of said contaminants;
    (d) after said machine coolant is centrifuged in said step (c), testing the chemical composition of said machine coolant to determine whether any components need to be added to said machine coolant; and
    (e) after said machine coolant is tested, continuously filtering said machine coolant to remove a third portion of said contaminants.

2. A method as defined in claim 1 additionally comprising the step of (f) removing a portion of the contaminants from the surface of said machine coolant.

3. A method as defined in claim 2 wherein said portion of contaminants is removed from the surface of said machine coolant by skimming the surface of said machine coolant.

4. A method as defined in claim 2 additionally comprising the step of (g) providing aeration to said machine coolant when said machine coolant is in said tank to accelerate the travel of contaminants towards the surface of the coolant.

5. A method of recycling machine coolant by filtration and centrifugation, said method comprising the steps of:
   (a) accumulating in a tank a volume of machine coolant to be recycled, said machine coolant containing undesired contaminants;
   (b) filtering said volume of machine coolant for a period of time to remove a first portion of said undesired contaminants;
   (c) after said machine coolant is filtered in said step (b), centrifuging said machine coolant to remove a second portion of said contaminants;
   (d) after said machine coolant is centrifuged in said step (c), filtering said machine coolant to remove a third portion of said contaminants.

6. A method of recycling machine coolant as defined in claim 5 additionally comprising the step of (e) testing the chemical composition of said machine coolant to determine whether any components need to be added to said machine coolant.

7. A method as defined in claim 5 additionally comprising the step of (e) removing a portion of the contaminants from the surface of said machine coolant.

8. A method as defined in claim 5 additionally comprising the step of (e) providing aeration to said machine coolant.

9. A method of recycling machine coolant via filtration and centrifugation, said method comprising the steps of:
   (a) accumulating in a tank a volume of machine coolant that is to be recycled;
   (b) filtering a portion of said accumulated volume of said machine coolant;
   (c) centrifuging said machine coolant after said machine coolant has been filtered in said step (b);
   (d) accumulating in a tank of volume of said machine coolant that has been centrifuged in said step (c); and
   (e) filtering said volume of said machine coolant accumulated in said step (d).

10. A method of recycling machine coolant as defined in claim 9 additionally comprising the step of (f) testing the chemical composition of said machine coolant to determine whether any components need to be added to said machine coolant.

11. A method of recycling machine coolant as defined in claim 9 wherein a portion of said volume of machine coolant is filtered more than once in said step (e).

12. A method of recycling machine coolant as defined in claim 9 wherein said step (b) removes a portion of undesired contaminants of a first size and wherein said step (e) removes a portion of undesired contaminants of a second size, said second size being smaller than said first size.

13. A method as defined in claim 9 additionally comprising the step of (f) removing a portion of the contaminants from the surface of said machine coolant.

14. A method as defined in claim 13 wherein said portion of contaminants is removed from the surface of said machine coolant by skimming the surface of said machine coolant.

15. A method as defined in claim 9 additionally comprising the step of (f) providing aeration to said machine coolant.

16. A method of recycling machine coolant comprising the steps of:
   (a) accumulating in a tank a volume of machine coolant to be recycled, said machine coolant being collected from a number of various points remote from said tank, said machine coolant containing undesired contaminants;
   (b) filtering said volume of machine coolant for a period of time by passing said volume of machine coolant through a first filter to remove a first portion of said contaminants of a relatively large size and through a second filter to remove a second portion of said contaminants of a relatively small size, said volume of machine coolant being passed through said first and second filters more than once;
   (c) after said volume of machine coolant is filtered during said step (b), passing said volume of machine coolant through a centrifuge to remove a third portion of said contaminants;
   (d) after said machine coolant is centrifuged in said step (c), testing the chemical composition of said machine coolant to determine whether any components need to be added to said machine coolant; and
   (e) after said machine coolant is tested, continuously filtering said machine coolant to remove a fourth portion of contaminants.

17. A method of recycling machine coolant comprising the steps of:
   (a) accumulating in a tank a volume of machine coolant to be recycled, said machine coolant being collected from a number of various points remote from said tank, said machine coolant containing undesired contaminants;
   (b) filtering said volume of machine coolant for a period of time by passing said volume of machine coolant through a first filter to remove a first portion of said contaminants of a first size and through a second filter to remove a second portion of said contaminants of a second size, said second size being smaller than said first size, said volume of machine coolant being passed through said first and second filters more than once;
   (c) removing a third portion of said contaminants from the surface of said volume of machine coolant;
   (d) after said volume of machine coolant is filtered during said step (b), passing said volume of machine coolant through a centrifuge to remove a fourth portion of said contaminants;
   (e) after said machine coolant is centrifuged in said step (d), testing the chemical composition of said machine coolant to determine whether any components need to be added to said machine coolant; and
   (f) after said machine coolant is tested, continuously filtering said machine coolant to remove a fifth portion of contaminants.

* * * * *